United States Patent [19]

MacKenzie, Jr. et al.

[11] 4,153,752

[45] May 8, 1979

[54] DIELECTRIC INSULATING POLYOLEFIN COMPOUNDS AND CONDUCTOR PRODUCTS INSULATED THEREWITH

[75] Inventors: Burton T. MacKenzie, Jr., Lawrence, Kans.; Maurice Prober, Fairfield; Stanley E. Kiersztyn, Orange, both of Conn.

[73] Assignee: General Electric Company, New York, N.Y.

[21] Appl. No.: 843,614

[22] Filed: Oct. 19, 1977

[51] Int. Cl.² .............................................. B32B 25/20
[52] U.S. Cl. ................................. 428/379; 174/110 S; 174/110 SR; 174/110 PM; 260/42.29; 260/827; 427/58; 427/120; 428/447; 428/391
[58] Field of Search ........................ 428/447, 391, 379; 427/170, 58; 174/110 SR, 110 PM, 110 S; 260/42.29, 827, 42.26

[56] References Cited

U.S. PATENT DOCUMENTS

| | | | |
|---|---|---|---|
| 2,888,242 | 5/1959 | Precopio et al. | 260/41 |
| 3,148,169 | 9/1964 | Martens et al. | 260/41 |
| 3,185,663 | 5/1965 | Prober et al. | 260/46.5 |
| 3,185,719 | 5/1965 | Prober | 260/148.2 |
| 3,795,646 | 3/1974 | MacKenzie | 260/29.1 SB |
| 3,859,247 | 1/1975 | MacKenzie | 260/42.15 |
| 3,957,719 | 5/1976 | MacKenzie | 260/42.42 |

*Primary Examiner*—George F. Lesmes
*Assistant Examiner*—E. Rollins Buffalon
*Attorney, Agent, or Firm*—R. G. Simkins

[57] ABSTRACT

Polyolefin compounds containing nitrile polysiloxane fluid which have improved electrical properties, and electrical conductors insulated therewith.

8 Claims, 1 Drawing Figure

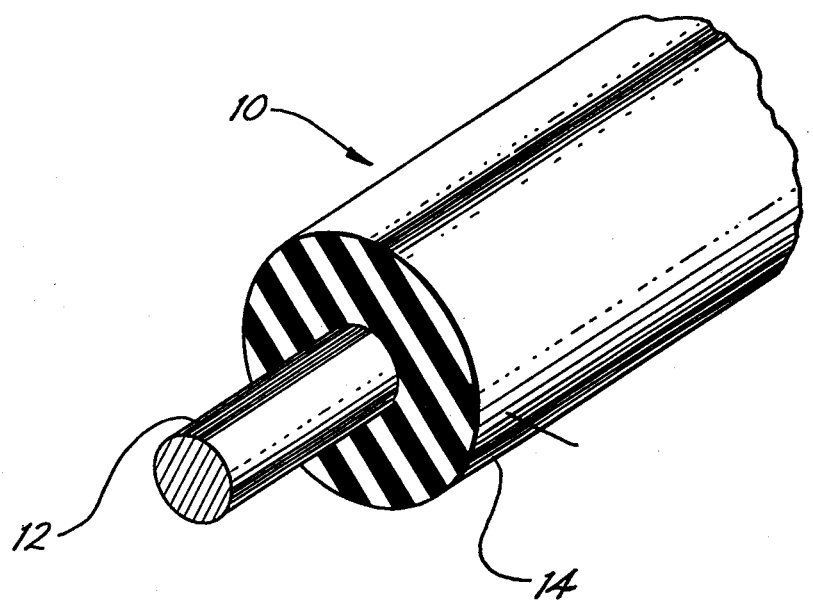

DIELECTRIC INSULATING POLYOLEFIN COMPOUNDS AND CONDUCTOR PRODUCTS INSULATED THEREWITH

BACKGROUND OF THE INVENTION

Particular electrical properties are of significant advantage in polymer dielectric insulating compounds for use in high voltage service, such as high voltage direct current applications. For instance, the slope of a plotted curve ($\alpha$) for the volume resistivity of a given insulating material in relation to temperature changes therein, should be as flat as possible, whereas the slope of a plotted curve ($\beta$) for the volume resistivity of the same insulation in relation to the dc stress in the insulation should be as steep as possible for optimum performance. This combination of electrical properties for an insulation, together with a high direct current dielectric strength, provides a superior direct current insulating assuring an optimum dc cable performance for a given delta temperature ($\Delta T$) across the thickness of the body of insulation.

SUMMARY OF THE INVENTION

This invention comprises a novel polymeric dielectric insulating compound possessing a combination of significant electrical properties and attributes, such as volume resistivity and stress characteristics over an operating range of temperature conditions, so as to meet the aforesaid requirements of exhibiting optimum $\alpha$ and $\beta$ curves, and thereby providing an improved insulation for direct current transmission and other electrical service.

The invention is specifically directed to a new and advantageous insulated conductor product for high voltage direct current transmission.

OBJECTS OF THE INVENTION

A primary object of this invention is to provide a new polymeric compound having improved electrical properties.

Another object of this invention is to provide a novel dielectric insulating material of a filled polyolefin compound having distinctive and advantageous electrical properties.

A further object of this invention is to provide a new and improved insulation for direct current transmission service.

It is also an object of this invention to provide electrical conductor products such as wire and cable insulated with polymeric compounds having distinctive and improved dc electrical properties.

BRIEF DESCRIPTION OF THE DRAWING

The FIGURE comprises a perspective view illustrating an insulated conductor of this invention.

DETAILED DESCRIPTION OF A PREFERRED EMBODIMENT

In accordance with the preferred embodiment of this invention, the electrical properties of polyolefin compositions containing ethylene are significantly enhanced by including in compounds of such polymers small amounts of a nitrile polysiloxane such as cyanoethyl polysiloxane fluid.

Polyolefin insulating compositions which are the subject of this invention comprise curable or thermosettable compounds primarily composed of an ethylene-containing polymer, such as polyethylene, and peroxide curing agent therefor, clay filler, and the nitrile polysiloxane in amounts of about 1 to about 5 parts by weight per 100 parts of clay filler.

The ethylene-containing polymer component comprises homopolymer of ethylene, which may be used alone or blended with other polymers or copolymers, and copolymers of ethylene and other polymerizable materials such as vinyl acetate or propylene. Suitable copolymers of ethylene include, for example, ethylene-propylene rubbers, ethylene-propylene terpolymers, and ethylene-vinyl acetate containing at least about 50 mole percent of ethylene, and preferably about 70 mole percent thereof.

Peroxide curing agents comprise organic peroxides such as a tertiary peroxide, and characterized by at least one unit of the structure:

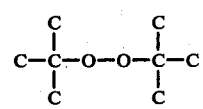

which decomposes at a temperature above about 295° F. The use of these free radical forming peroxide curing agents in effecting cross-link curing of polymers. such as polyethylene or ethylene-containing polymer compounds, is described in U.S. Pat. Nos. 2,888,424; 3,079,370; 3,086,966; and 3,214,422. A preferred peroxide is di-$\alpha$-cumyl peroxide, and other suitable peroxides comprising the tertiary diperoxides such as 2,5-dimethyl-2,5-di-(t-butyl peroxy) hexane and 2,5-dimethyl-2,5-di(t-butyl peroxy) hexyne-3, and the diperoxy and polyperoxide compounds.

The ratio of peroxide curing agent to the ethylene containing polymeric material depends primarily upon the physical and chemical properties desired in the cured product such as the degree of solvent resistance or hot tensile strength. Amounts of peroxide curing agent of from about 0.5 to 10 parts by weight per 100 parts of the polymeric material satisfy most requirements, and typically proportions of about 2 to 5 parts by weight suffice for polymeric insulations for most electrical insulating service.

Clay fillers of this invention comprise natural or synthetic materials predominantly composed of aluminum silicate and substantially exhibiting the attributes of mineral clays. Natural clay products are preferably calcined to minimize water and organic contents. Clay fillers are typically added to ethylene-containing polymeric compounds in amounts up to about 200 parts by weight per 100 parts by weight of polymer, and preferably for higher ethylene content polymers, about 25 to about 75 parts by weight per 100 parts of polymer.

Nitrile polysiloxane fluids for the practice of this invention comprise those nitrile polysiloxanes disclosed in U.S. Pat. Nos. 3,185,663 and 3,185,719, and the disclosure of such patents is therefore incorporated herein by reference. The nitrile polysiloxane component of the compound of this invention is included in the clay-filled polyolefin compounds in amounts of about 1 to about 5 parts by weight per 100 parts by weight of the clay filler.

A polyolefin compound containing a cyanoethyl polysiloxane fluid incorporated therein provides a polymeric insulation with a very low $\alpha$ at 500 volts per mil and excellent direct current breakdown strength. Moreover, the compound has the added advantage that $\alpha$ changes greatly with electrical stress which has the effect of equalizing the stress across a body or layer of insulation while a given temperature gradient ($\Delta T$) is applied across the insulation. Thus the nitrile polysiloxanes function as voltage grading additives.

Electrical insulating materials for electrical conductors composed of the foregoing combination of ingredients, and providing optimum electrical properties for direct current transmission service, such as a relatively flat sloping $\alpha$ curve and relatively steep $\beta$ curve, are prepared, coated on electrical conductors, and then cross-link cured according to conventional compounding, extrusion molding and curing techniques and procedures. For example, polyolefin insulating material composed of the above-described unique combination of ingredients of this invention are produced by preparing an admixture or blended compound of the basic ingredients described hereinbefore. The prepared admixture or blended compound is then shaped or formed to the product configuration by any suitable or conventional molding technique, such as extrusion molding of a coating or covering continuum about a wire or cable conductor, and then cured to a substantially permanent thermoset form by the application of heat to activate the peroxide curing agent in a conventional manner. Typical curing temperature comprise about 300° F. to about 400° F., and high pressure steam constitutes the commonest source of curing heat as is evident from the prior art.

The following examples demonstrate the effects of this invention upon the electrical properties of a typical polymeric insulation composition comprising filled, cross-linked polyethylene. The insulating composition formulation of the standard and of the example of this invention are all given in parts by weight, and the standard and example compositions were prepared and tested under identical conditions.

The compositions comprising the standard and example of this invention are as follows:

| Ingredients | Standard | Example |
|---|---|---|
| Polyethylene | 100 | 100 |
| Clay Filler | 50 | 50 |
| Antioxidant-Agerite PE (polymerized 1,2-dihydro-2,2,4-trimethylquinoline) | 1.5 | 1.5 |
| Curing agent - Dicumyl peroxide | 3.5 | 3.5 |
| Dimethyl polysiloxane fluid (viscosity of about 50 ctks.) | 1.5 | — |
| Cyanoethyl polysiloxane fluid (viscosity of about 500 ctks.) | — | 1.5 |

Polymeric compounds of each of the standard and example were extrusion molded on #18 solid copper conductor, over a 0.020 inch layer of a semiconductive material, and in an insulating body or layer thickness of about 0.030 inch, then steam cured. The direct current electrical properties of each of the conductors insulated with the standard composition and with the example of this invention were determined and found to be as follows:

| D.C. Electrical Properties | Standard | Example |
|---|---|---|
| $\alpha$ at 50 volts per mil | 0.085 | 0.100 |
| $\alpha$ at 500 volts per mil | 0.072 | 0.052 |
| $\beta$ at 70° C. | 0.0049 | 0.0022 |
| Breakdown, quick rise | | |
| KV dc + | 110 | 138 |
| KV dc − | 100 | 130 |

The compositions comprising a polymer containing ethylene of this invention may include other ingredients or additives depending upon their intended use and requirements therefor. For example, antioxidants are generally included such as polymerized trimethyl hydroquinoline, coloring pigments such as titanium dioxide or carbon. Other conventional compounding ingredients which may be included comprise preservatives, processing aids such as lubricants or mold releasing agents, pigments, etc., or fillers such as aluminum oxide, calcium silicates, magnesium silicates, magnesium oxide, titanium dioxide, particulate glass, and the like. Such fillers in conventional fine particle size may be included in the ethylene containing polymers in amounts up to about 200 parts by weight per 100 parts or the polymer content, and preferably in amounts of about 20 to 100 parts by weight thereof.

A typical insulated electrical conductor product of this invention is illustrated in the drawing. Referring to the drawing, an insulated product 10 comprises a metallic conductor 12, composed of a single strand as shown or a bundle of individual strands, having an overlying electrical insulating covering 14 of a polymeric composition according to the present invention which provides improved electrical properties.

Although the invention has been described with reference to certain specific embodiments thereof, numerous modifications are possible and it is desired to cover all modifications falling within the spirit and scope of this invention.

What we claim as new and desire to secure by Letters Patent of the United States is:

1. An electrical conductor with a polymeric dielectric insulation comprising a metal conductor insulated with a cross-link cured, ethylene containing polyolefin compound containing cyanoalkyl polysiloxane fluid.

2. The electrical conductor of claim 1, wherein the cross-link cured polyolefin compound contains clay filler.

3. The electrical conductor of claim 2, wherein the cyanoalkyl polysiloxane fluid is present in amount of about 1 to about 5 parts by weight per 100 parts by weight of the clay filler.

4. An electrical conductor with a polymeric dielectric insulation for direct current transmission, comprising a metal conductor insulated with a cross-link cured polyolefin of at least one polymeric composition containing ethylene selected from the group consisting of the homopolymer of ethylene and copolymers of ethylene and other polymerizable materials, clay filler, and cyanoalkyl polysiloxane fluid.

5. The electrical conductor of claim 4, wherein the cyanoalkyl polysiloxane fluid is present in amount of about 1 to about 5 parts by weight per 100 parts by weight of the clay filler.

6. An electrical conductor for direct current transmission with a polymeric insulation, comprising a metal conductor insulated with a cross-link cured polyolefin compound including 100 parts by weight of at least one polymeric composition containing ethylene selected from the group consisting of polyethylene and copolymers of ethylene and other polymerizable materials, about 10 to about 200 parts by weight of clay filler per 100 parts by weight of the polymeric composition, and about 1 to about 5 parts by weight of cyanoethyl polysiloxane fluid per 100 parts by weight of the clay filler.

7. An electrical conductor for direct current transmission with a polymeric insulation, comprising a metal conductor insulated with a cross-link cured polyethylene compound containing 100 parts by weight of polyethylene, about 25 to about 100 parts by weight of clay filler per 100 parts by weight of polyethylene, and about 1 to about 5 parts by weight of cyanoethyl polysiloxane fluid per 100 parts by weight of the clay filler.

8. An electrical conductor for direct current transmission with a polymeric insulation, comprising a metal conductor insulated with a cross-link cured polyolefin compound containing 100 parts by weight of polyethylene, about 50 parts by weight of clay filler, and about 1.5 parts by weight of cyanoethyl polysiloxane fluid.

* * * * *